(12) United States Patent
Gotschmann et al.

(10) Patent No.: US 9,467,014 B2
(45) Date of Patent: Oct. 11, 2016

(54) ROTOR FOR AN ELECTRICAL MACHINE

(71) Applicant: FLSmidth A/S, Valby (DK)

(72) Inventors: Norbert Gotschmann, Haguenau (FR); Stefan Rittler, Freienstein (CH)

(73) Assignee: FLSMIDTH A/S (DK)

( * ) Notice: Subject to any disclaimer, the term of this patent is extended or adjusted under 35 U.S.C. 154(b) by 0 days.

(21) Appl. No.: 15/022,195

(22) PCT Filed: Sep. 26, 2014

(86) PCT No.: PCT/EP2014/070650
§ 371 (c)(1),
(2) Date: Mar. 15, 2016

(87) PCT Pub. No.: WO2015/044369
PCT Pub. Date: Apr. 2, 2015

(65) Prior Publication Data
US 2016/0226326 A1 Aug. 4, 2016

(30) Foreign Application Priority Data

Sep. 27, 2013 (DK) .................................. 2013 70537

(51) Int. Cl.
*H02K 1/27* (2006.01)
*H02K 21/04* (2006.01)
*H02K 1/28* (2006.01)

(52) U.S. Cl.
CPC .............. *H02K 1/2766* (2013.01); *H02K 1/28* (2013.01); *H02K 21/046* (2013.01)

(58) Field of Classification Search
CPC ........ H02K 1/2766; H02K 1/28; H02K 1/27; H02K 1/276; H02K 1/2753; H02K 1/274; H02K 21/046; H02K 21/04
USPC ............ 310/156.21, 156.43, 156.48, 156.49, 310/156.53
See application file for complete search history.

(56) References Cited

U.S. PATENT DOCUMENTS

| 4,327,302 A * | 4/1982 | Hershberger | ........ H02K 1/2766 310/156.56 |
| 2002/0163270 A1 | 11/2002 | Almada | |

(Continued)

FOREIGN PATENT DOCUMENTS

| DE | 2062486 A1 | 7/1972 | |
| FR | 2802726 A1 * | 6/2001 | ........... H02K 1/2766 |

(Continued)

OTHER PUBLICATIONS

Machine translation of FR 2802726 A1 (Jun. 2001).*

(Continued)

*Primary Examiner* — Michael Andrews
(74) *Attorney, Agent, or Firm* — Jeffrey A. Sharp; Daniel DeJoseph; Matthew R. Weaver

(57) ABSTRACT

The present application relates to a rotor (1) for an electrical machine. The rotor (1) comprises at least one substantially cylindrically shaped ferromagnetic base element (2). Said ferromagnetic base element (2) includes a multitude of posts (3, 3.1, 3.2) radially extending therefrom, each of said posts (3, 3.1, 3.2) being bordered by at least a first lateral surface (4) and a second lateral surface (5), wherein recesses (7) are defined between each pair of neighbouring posts (3, 3.1, 3.2). One ferromagnetic intermediate member (13) is arranged in each recess (7) between each pair of posts (3, 3.1, 3.2). Each ferromagnetic intermediate member (13) is affixed to the first lateral surface (4) of a first post (3.1) and to the second lateral surface (5) of a second post (3.2) of each pair of posts (3, 3.1, 3.2) by means of at least one permanent magnet (6, 6.1, 6.2), respectively, said permanent magnets (6, 6.1, 6.2) being each oriented such that the same pole faces said ferromagnetic intermediate members (13). The first lateral surface (4) and said second lateral surface (5) are shaped such that the distance between the first lateral surface (4) and the second lateral surface (5) decreases with increasing distance from the rotation axis (11) of the rotor (1) in a radial direction and an inner surface (15) of each ferromagnetic intermediate member (13) is facing towards the rotor axis (11) and is covered with at least one additional permanent magnet (20.1, 20.2, 20.3). At least one additional permanent magnet (20.1, 20.2, 20.3) is arranged such that the pole oriented towards the ferromagnetic intermediate members (13) and is the same pole as the pole of the permanent magnets (6, 6.1, 6.2) oriented towards said ferromagnetic intermediate members (13).

15 Claims, 6 Drawing Sheets

(56) References Cited

U.S. PATENT DOCUMENTS

| | | | |
|---|---|---|---|
| 2006/0290221 A1* | 12/2006 | Hsu | H02K 21/046 310/156.53 |
| 2011/0057533 A1* | 3/2011 | Murakami | H02K 1/2766 310/156.43 |
| 2013/0026871 A1 | 1/2013 | Van Dam | |

FOREIGN PATENT DOCUMENTS

| | | |
|---|---|---|
| JP | 05292691 | 11/1993 |
| JP | 2008278649 A | 11/2008 |
| JP | 2010220359 A | 9/2010 |
| WO | 2013081703 A2 | 6/2013 |

OTHER PUBLICATIONS

International Search Report and Written Opinion dated Aug. 13, 2015, 10 pages.

Written Opinion of the International Preliminary Examining Authority dated Jan. 11, 2016, 6 pages.

* cited by examiner

ROTOR FOR AN ELECTRICAL MACHINE

TECHNICAL FIELD

The invention relates to a rotor for an electrical machine.

BACKGROUND ART

Rotors for electrical machines, specifically for synchronous electrical machines are well known in the art. Especially in the case where strong neodymium iron boron magnets are used, the fastening of such magnets on the rotor becomes quite challenging. Different solutions for providing a fastening of such strong magnets have been proposed in the state of the art.

In a thesis submitted by Eckard Nipp (Permanent Magnet Motor Drives with Switched Stator Windings; Thesis submitted to the School of Electrical Engineering and Information Technology, KTH; Royal Institute of Technology of Electric Power Engineering Machines and Drives, Stockholm, 1999), the embedding of magnets into the rotor structure was proposed.

EP 2 187 503 (Traktionssysteme Austria GmbH) relates to a rotor for an electrical machine, wherein a multitude of openings are provided along the circumference of the rotor, permanent magnets being arranged within said openings. To reduce the magnetic leakage flux and enhance the stability of the rotor, the openings comprise voids arranged towards the neighbouring openings.

JP 2011/066373 (Nissan Motor Co. Ltd.) proposes to arrange two embedded magnets in a V-shape that opens towards the outer periphery of the rotor. A further permanent magnet is positioned parallel to the circumferential direction to the open part of the V-shape.

However, such embedding of magnets has the disadvantage of creating a magnetic short circuit and hence provides a decreased magnetic flux density in the air gap between the rotor and the stator.

EP 0 996 212 (Technische Universität Eindhoven) proposes to provide a rotor support upon which at least two poles are provided on the periphery, each pole comprising a permanent magnet. A screen made of highly conducting material is arranged on the surface of the permanent magnets. The screen is configured to face the stator of an electric machine.

EP 2 068 425 (E & A Forschungsinstitut Elmas) is also directed to the use of a bandage enrobing a rotor with magnets provided on an outer periphery of the rotor.

Use of retaining elements like bandages provides a good mechanical attachment of magnets to a rotor. However, eddy current loses are caused close to the air gap of the electrical machine, since alternating magnetic fields induced by the windings of a stator have a significant impact on magnets arranged close to said gap. This results in a temperature rise and a decrease of the efficiency of the electrical machine. Cooling of the magnets to reduce such heat losses is difficult since the retaining elements cause an additional heat insulation of the magnets. Further, retaining elements may be damaged during assembly or operation of the rotor and become detached of the magnets. Detachment of a retaining element during operation of the rotor may cause heavy damage to the rotor or the electrical machine.

Another approach is used by e.g. EP 1 860 755, where a circumferential array of magnet carriers is affixed to an outer rim of a rotor. An inverted U-shaped pole piece retainer made of non-magnetic material is affixed to each magnet carrier and is formed with an axially extending channel. A pole piece made of magnetic material is located adjacent to the radial outer surface of each magnet carrier and in the channel formed in its associated pole piece retainer.

WO 2009/068736 (Neorem Magnets OY) discloses a surface-mountable permanent magnet element to be mounted onto the periphery of a rotor. The permanent magnet element comprises at least one permanent magnet as well as a protective case enclosing said permanent magnet. The protective case includes a securing member for securing the element on the periphery of a rotor. Further, a housing formed of metal thin sheet covers the permanent magnet.

Such metallic caps arranged on top of permanent magnets with the goal of rigidly securing the magnets on a rotor have the disadvantage that significant eddy currents are generated in those metallic caps, which cause a decrease in the efficiency of the electrical machine.

A further approach is described in EP 1 777 795 (The General Electric Company), where a pole assembly including a permanent magnet block, a plurality of laminations comprising a pole cap mechanically coupled to the pole, as well as a plurality of laminations comprising a base plate mechanically coupled to said pole is arranged on the periphery of a rotor.

US 2013/0140932 (General Electric Company) proposes a rotor core for an electric machine, said rotor core comprising spokes arranged radially about the rotor core and being attached to the rotor core by means of a form-fit interlock with tenons radiating from said rotor core. Conductors are arranged within conductor openings located between two adjacent spokes.

However, these two arrangements both use a great number of separate parts and are thus cumbersome and expensive in manufacture.

US 2013/0169081 (Siemens Aktiengesellschaft) describes a rotor for an electrical machine comprising a plurality of segments. A fan is arranged at least between two of these segments. A plurality of segments is joined to form a rotor core, while end sheets are attached to the axial ends of the rotor core.

SUMMARY OF THE INVENTION

It is the object of the invention to create a rotor pertaining to the technical field initially mentioned, which allows a secure mechanical attachment of permanent magnet poles to a rotor while avoiding the occurrence of magnetic short circuits or eddy currents. Further, the inventive rotor should avoid any element having an additional heat insulating effect and use as few parts as possible to reduce the costs and the duration of production of such a rotor.

The solution of the invention is specified by the features of claim 1. According to the invention, a rotor comprises at least one substantially cylindrically shaped ferromagnetic base element. The ferromagnetic base element includes a multitude of posts radially extending therefrom, each of these posts being bordered by at least a first lateral surface and a second lateral surface, while recesses are defined between each pair of neighbouring posts. One ferromagnetic intermediate member is arranged in each recess between each pair of posts, each ferromagnetic intermediate member being affixed to the first lateral surface of a first post and to the second lateral surface of a second post of each pair of posts by means of at least one permanent magnet, respectively. The permanent magnets are each oriented such that the same pole faces said ferromagnetic intermediate members.

With this configuration, the posts of the ferromagnetic base element act as first pole of the rotor, while the ferromagnetic intermediate members act as the second, opposite pole of the rotor. This has the advantage that the rotor poles of a first polarity of the rotor are all comprised in a single, unitary piece of ferromagnetic material, while only the poles with the opposite polarity have to be separately attached to the rotor. This greatly reduces the number of parts needed for assembling the rotor and hence reduces the complexity and costs of the manufacture of the rotor. Additionally, only one magnet (or magnet set if more than one permanent magnet is used) is needed for each rotor pole pair, e.g. each pair of one ferromagnetic intermediate member and one post. Further, the magnetic forces already hold the ferromagnetic intermediate members in place, such that the ferromagnetic intermediate members only have to be additionally anchored to the ferromagnetic base element such as to provide a sufficient attachment against acceleration forces and the centrifugal force occurring during the operation of the rotor within an electrical machine.

The inventive rotor is intended to be used in an electrical machine such as an electric motor, preferably of the synchronous type, or an electric generator. In such applications the rotor is arranged in a rotatable way concentrically within a stator comprising a multitude of windings, an air gap being provided between said stator and said rotor.

The ferromagnetic base element is preferably cylindrically shaped, i.e. it comprises a substantially circular cross-section in a plane perpendicular to its axis of rotation. Alternatively, the cross-section may also be polygonal. It is however important that the mass of the ferromagnetic base element is symmetrically distributed around the axis of rotation such as to avoid any imbalance during the rotation of the rotor in an electrical machine.

The ferromagnetic base element preferably comprises an even number of posts extending radially therefrom. The number of posts may vary depending on the number of poles needed and on the diameter of the ferromagnetic base element. Generally, the rotor according to the present invention comprises the same number of posts as the number of pole pairs (equalling half the number of individual poles). The minimal number of pole pairs and hence of posts for an operational rotor is 2 (equalling 4 individual poles). Preferably, the rotor comprises more pole pairs (and the ferromagnetic base element hence more posts). Preferably, the number of pole pairs/posts is from 6 to 20 pole pairs, more preferably from 8 to 14 pole pairs. Such as to avoid any imbalance of the rotor, the poles are preferably evenly and symmetrically distributed along the circumference of the ferromagnetic base element.

The posts may have any possible shape but are preferably polygonal. The dimension of the posts has to be adapted to provide a sufficient support for the ferromagnetic intermediate members taking into account any centrifugal, shear or other forces occurring during the operation of the rotor. Obviously, the dimensions of the posts will also have to be adapted to the characteristics of the material used for the ferromagnetic base element.

Such as to translate rotational energy, the ferromagnetic base element preferably comprises an opening to receive and be connected to a shaft.

The ferromagnetic base element as well as the ferromagnetic intermediate members are preferably made of magnetic steel. The at least one permanent magnet is preferably a neodymium iron boron magnet ($Nd_2Fe_{14}B$), also simply known as neodymium magnets. Alternatively, other types of magnets may be used.

It is apparent for a person having skill in the art that the ferromagnetic intermediate members have dimensions which allow for an insertion into the recesses, i.e. the outer dimensions of the ferromagnetic intermediate members are smaller than the dimensions of the recesses at least in a plane perpendicular to the axis of rotation of the rotor. Further, the ferromagnetic intermediate members are dimensioned such that at least one permanent magnet may be arranged between the at least first lateral surface and the at least second lateral surface and the ferromagnetic intermediate member. Further, such as to avoid a magnetic short circuit, the ferromagnetic intermediate members have to be shaped and dimensioned such that they do not contact the ferromagnetic base element.

The ferromagnetic base element and/or the ferromagnetic intermediate members may be comprised of a plurality of core sheets, preferably made of magnetic steel. This helps minimizing the occurrence of eddy currents in the ferromagnetic base element and/or the ferromagnetic intermediate members.

Preferably, said first lateral surface and said second lateral surface of said posts and/or surfaces of the ferromagnetic intermediate members facing said first lateral surface and said second lateral surface comprise at least one connection element allowing a form-fit connection with said at least one permanent magnet. The connection element preferably is in the form of a nose.

By providing a form-fit connection a mechanical attachment of the ferromagnetic intermediate members with the permanent magnets and/or a mechanical attachment of the permanent magnets with the posts is achieved. This additionally anchors the permanent magnets and/or the ferromagnetic intermediate members to the base element of the rotor against dislodgment caused by forces acting on the rotor, such as gravitation, centrifugal or shear forces. With such a configuration it is even possible to foresee no adhesive bonding between the permanent magnets and the posts and/or the ferromagnetic intermediate members, as the form-fit elements on their own are sufficient to exert sufficient holding forces to prohibit any radial dislodgement of the permanent magnets and/or the ferromagnetic intermediate members.

The at least one permanent magnet is preferably fastened to said first lateral surface and said second lateral surface and/or to surfaces of the ferromagnetic intermediate member facing said first lateral surface and said second lateral surface by means of an adhesive, preferably by an adhesive comprising silicone. Providing an adhesive provides an additional anchoring of the permanent magnets and/or the ferromagnetic intermediate members against dislodgment. Adhesives comprising silicone are relatively soft and hence help reduce the shear stress in the adhesive bond which is caused by the different thermal expansion coefficients of the ferromagnetic material and the material of the permanent magnets. This is especially important in the case where magnetic steel is used as ferromagnetic material and neodymium magnets are used as permanent magnets, as the thermal expansion coefficients for both materials are quite diverging. Further, a relatively soft elastic adhesive comprising silicone prevents the occurrence of micro movements of both the permanent magnets and/or the ferromagnetic intermediate members caused by vibrations of the rotor. In a preferred embodiment, a combination of form-fit connection and adhesive connection is used to attach the permanent magnets to the first and second lateral surface of the posts and the corresponding surfaces on the ferromagnetic intermediate members. Such a combination has the advantage that any failure of an adhesive bond will not result in a detachment of the permanent magnet and/or a ferromagnetic intermediate member from the rotor, since the form-fit connection provides for a sufficient connection.

Preferably, the first lateral surface and the second lateral surface are shaped such that the distance between the first lateral surface and the second lateral surface decreases with increasing distance from the central axis of the rotor in a radial direction.

Hence, the recesses become narrower at least in a dimension which lies in a plane perpendicular to the axis or rotation of the rotor with increasing distance from said axis of rotation.

Preferably, the first and second lateral surfaces are planar. In the case of a decreasing distance this means that both the first and second lateral surface will include an angle between each other. This angle, which is located on the intersection of imaginary prolongations of both lateral surfaces in the radial direction, is preferably 90° or less, more preferably between 45° and 90°.

By providing such narrowing recesses the assembly of ferromagnetic intermediate members and permanent magnets will be pushed against the inclined lateral surfaces of neighbouring posts by centrifugal forces occurring during rotation of the rotor. This provides for a further mechanical support of the ferromagnetic intermediate members and the permanent magnets against dislodgment caused by centrifugal forces.

Such as to maximize this effect the ferromagnetic members preferably comprise two surfaces arranged opposite the first and second lateral surfaces of the posts, these two surfaces also being planar and comprising the same angle between each other.

Preferably, each ferromagnetic intermediate member comprises more than one magnet elements, the magnet elements being arranged one to the other in the axial direction of the rotor.

It is understood that all magnet elements are arranged in the same orientation, i.e. the pole orientation of all magnet elements is identical. Preferably, three or more magnet elements are arranged between a ferromagnetic intermediate member and a first or second lateral surface. Hence, each ferromagnetic intermediate member is affixed to neighbouring posts by means of two permanent magnet composed of "packs" of magnetic elements.

Each permanent magnet pack may additionally be wrapped in a bandage of non-magnetic material. Such as not to interfere with the function of the permanent magnets, the bandage is only wrapped around those surfaces of the magnet pack which are not in contact with either a first or second lateral surface of a post or a surface of a ferromagnetic intermediate member. Bandages provide an additional protection of the rotor or any other part of an electrical machine in which the rotor is used, specifically the windings of the stator against small chippings of the rather brittle material of the permanent magnets. As these bandages do not need to retain the magnets against the centrifugal forces, they may be provided with a much smaller thickness than bandages known in the prior art. However, a smaller thickness results in a smaller heat insulation of the magnets and hence in an increased heat dissipation.

The rotor preferably comprises a multitude of ferromagnetic base elements stacked one upon the other in the axial direction of the rotor. By slightly spacing each ferromagnetic base element from the neighbouring ferromagnetic base elements, a coolant air circulation may be generated which increases heat dissipation out of the rotor.

Preferably, an intermediate spacer plate is arranged between each of two neighbouring ferromagnetic base elements. The intermediate spacer plate comprises radial air ducts.

With such an arrangement, an optimal radial air flow between two adjacent ferromagnetic base elements may be generated, thus providing for a good heat dissipation within the rotor.

Further preferably, neighbouring ferromagnetic base elements are shifted angularly to each other in the axial direction. The angular shift between two neighbouring ferromagnetic base elements is preferably between 0.2° and 1.5°, most preferably 0.75°.

Providing an angular shift between neighbouring ferromagnetic base elements allows minimizing the torque ripple during operation. Preferably, the angular shift between neighbouring ferromagnetic base elements is chosen such that an electric phase shift of 30° is achieved between a pole pair on the first ferromagnetic base element and a pole pair on the last ferromagnetic base element along the rotation axis of the rotor. For example, the suitable total angular shift $\Delta\alpha_{total}$ between the first and the last ferromagnetic base element of a rotor is calculated as:

$$\Delta\alpha_{total} = \frac{30°}{p}$$

where p is the number of pole pairs of the rotor.

The angular shift $\Delta\alpha$ between neighbouring ferromagnetic base elements may then be calculated by dividing the total angular shift $\Delta\alpha_{total}$ by the number of separations between ferromagnetic base elements:

$$\Delta\alpha = \frac{\Delta\alpha_{total}}{m-1}$$

where m is the total number of ferromagnetic base elements in the rotor.

For example, a rotor comprising ten pole pairs (p=10) per ferromagnetic base element and having five ferromagnetic base elements (m=5) has a total angular shift $\Delta\alpha_{total}$ of 3° (=30°/10). Hence, the angular shift between neighbouring ferromagnetic base elements $\Delta\alpha$ is 0.75° (=3°/(5−1)).

Preferably, a surface of each ferromagnetic intermediate member facing towards the axis of the rotor is covered with at least one additional permanent magnet, said at least one additional permanent magnet being arranged such that the pole oriented towards the ferromagnetic intermediate member is the same pole as the pole of the permanent magnets oriented towards said ferromagnetic intermediate members.

Provision of such magnets, which are arranged on a surface oriented towards the centre of the rotor, allow a significant reduction of leakage inductance directed towards said centre. By reducing this leakage inductance, the magnetic flux density in the air gap located between an inventive rotor and a stator can be increased.

This at least additional permanent magnet may be attached to the ferromagnetic intermediate member by means of an adhesive. Further, a form-fit connection may additionally or alternatively be provided to attach the at least one additional permanent magnet to the ferromagnetic intermediate member.

Preferably, at least one non-magnetic support member is arranged in each gap formed between a surface of a ferromagnetic intermediate member facing towards the axis of the rotor and the ferromagnetic base element.

Such non-magnetic support members ensure a minimal distance between each ferromagnetic intermediate member and the base element in the axial direction. As the ferromagnetic intermediate member and the base element carry a different magnetic polarity, maintenance of an optimal distance is important to maximize the magnetic flux density in the air gap between an inventive rotor and a stator.

Any additional permanent magnets may further be supported on the non-magnetic support member.

Preferably, said ferromagnetic intermediate members are made of a plurality of stacked sheets of magnetic steel.

Another aspect of the present invention relates to a method of manufacture of an inventive rotor. In a first step providing, at least one substantially cylindrically shaped ferromagnetic base element is provided. Said ferromagnetic base element includes a multitude of posts radially extending therefrom, each of said posts being bordered by at least a first lateral surface and a second lateral surface. In a second step, one ferromagnetic intermediate member for each recess defined between two posts is provided. Next, a first non-magnetic auxiliary element is arranged in a gap defined between the first lateral surface of a first post of each pair of posts and said ferromagnetic intermediate members. Then, a second non-magnetic auxiliary element is arranged in a gap defined between the second lateral surface of a second post of each pair of posts and said ferromagnetic intermediate member. In a further step, at least one paramagnetic third auxiliary element is arranged in a gap formed between a surface of a ferromagnetic intermediate member facing towards the axis of the rotor and the ferromagnetic base element. Finally, each of said first non-magnetic auxiliary elements and said second non-magnetic auxiliary elements are substituted with at least one permanent magnet one after the other and the at least one paramagnetic third auxiliary elements are substituted with at least one non-magnetic support member each.

The auxiliary elements help to pre-assemble the ferromagnetic base element and the ferromagnetic intermediate members by holding the ferromagnetic intermediate members transiently in place.

By arranging at least one paramagnetic third auxiliary element in the gap formed between a surface of a ferromagnetic intermediate member facing towards the axis of the rotor and the ferromagnetic base element, a closed magnetic flux circuit is induced when substituting said first and/or second non-magnetic auxiliary elements with the at least one permanent magnet. The circuit loops from said at least one permanent magnet through one post into the ferromagnetic base element, through the paramagnetic third auxiliary element into the ferromagnetic intermediate member and back to the at least one permanent magnet. As this magnetic flux circuit is induced, a magnetic force is generated which pulls said permanent magnet in the correct position. Hence, arranging of the at least one permanent magnet to the correct position does not need to be performed against any magnetic forces as is the case for many prior art rotors, but instead the magnets are even pulled to their correct location. This greatly facilitates the assembly of the inventive rotor.

Typically, a plurality of ferromagnetic base elements outfitted with permanent magnets and ferromagnetic intermediate members are arranged one to another on a shaft to form a rotor for an electrical machine. One embodiment on a method to assemble the ferromagnetic base elements together comprises a first step of arranging the plurality of ferromagnetic base elements, any intermediate spacer plates as well as two pressure plates onto an auxiliary shaft. In a next step, threaded bars are inserted through openings provided on all of said ferromagnetic base elements, any intermediate spacer plates and the two pressure plates, such that the threaded bars pass through the entire assembly in the axial direction. The threaded bars are fixed to the pressure plates by threading nuts on free ends of the threaded bars protruding from the pressure plates. By tightening the nuts on both sides of the assembly a compressive force may be exerted along the axial direction.

Preferably, the at least one ferromagnetic base element is arranged onto a shaft and attached thereto by means of an adhesive shrink fit connection.

After removal of the auxiliary shaft, a shaft, onto which an adhesive, preferably of the epoxy type has been applied, is inserted into the central opening and the entire assembled rotor is heated to a temperature suitable to allow an adhesive shrink fit connection between the assembly and the shaft. Typically, this temperature is around 120° C. to 130° C. In all cases, the temperature should not exceed any value which might have damaging effects on the permanent magnets or on any other part of the rotor.

Such an adhesive shrink fit connection of the assembly onto the shaft of the rotor has the advantage that the oversize of the shaft relative to the central opening may be minimized compared to a "classical" shrink fit connection, as the tangential forces acting on the boundary between shaft and assembly, which are caused by the momentum of rotation, are transmitted by the adhesive rather than by friction. The minimization of the oversize of the shaft has also the advantage that the adhesive applied onto the shaft is less subjected to be stripped off when inserting the shaft into the assembly.

Other advantageous embodiments and combinations of features come out from the detailed description below and the totality of the claims.

BRIEF DESCRIPTION OF THE DRAWINGS

The drawings used to explain the embodiments show.

In the figures, the same components are given the same reference symbols. When more than one of the same component is shown in a figure, each of these components is denominated with an additional number. I.e. if more than one component with the reference number X is shown, each of these components will be numbered X.1, X.2, etc. It is to be understood that each component X is identical and that the additional numeral is being used to emphasize that in fact more than one of the component X is being shown.

Preferred Embodiments

Figure 1:
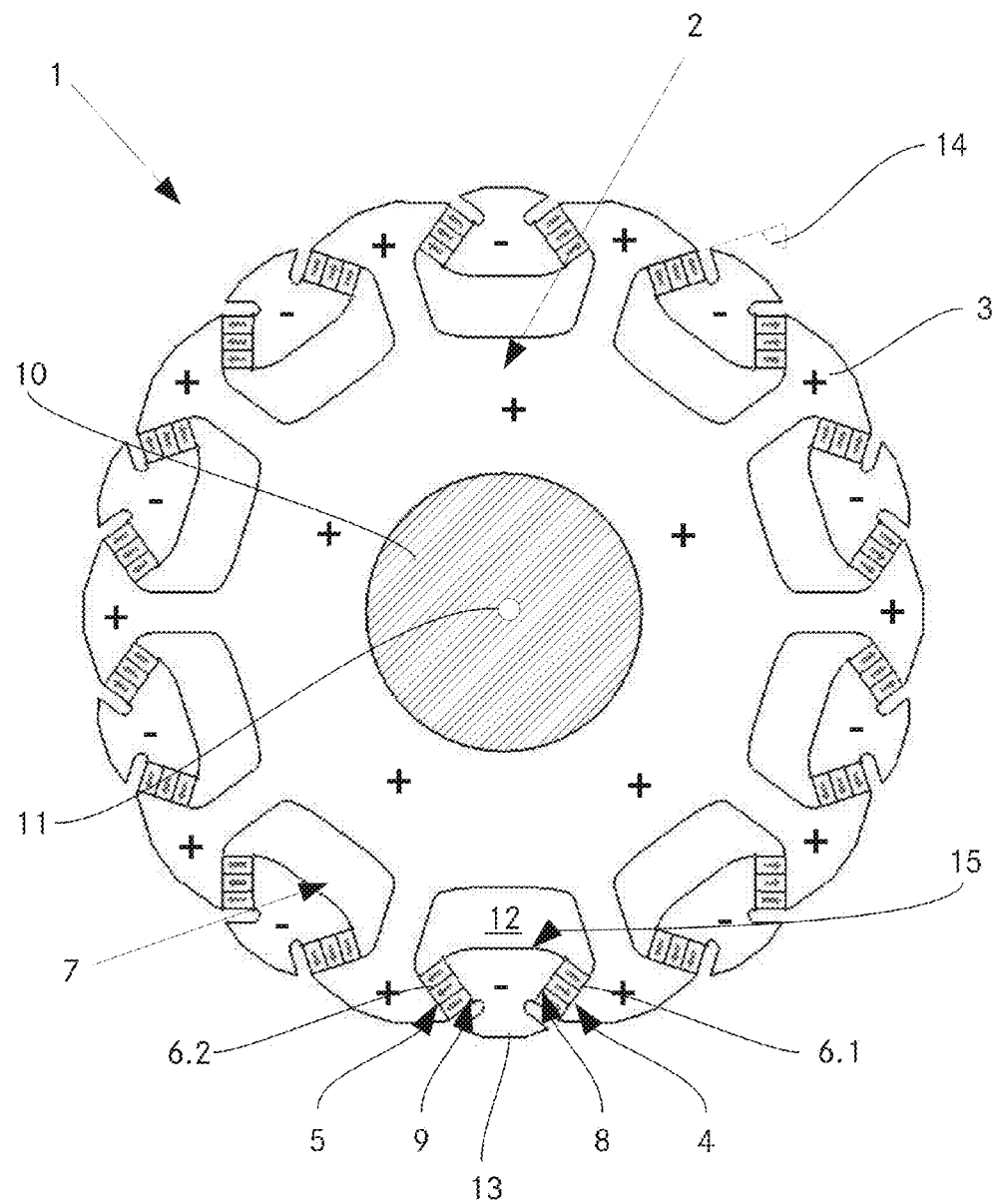
FIG. 1 a schematic representation of a rotor according to the present invention.

FIG. 1 shows a schematic representation of an inventive rotor 1. The rotor 1 comprises a ferromagnetic base element 2 which is cylindrical. The ferromagnetic base element 2 includes a plurality of posts 3 extending therefrom in a radial direction. Each post 3 includes at least a first lateral surface 4 and at least a second lateral surface 5. A recess 7 is formed between two neighbouring posts 3. A ferromagnetic intermediate member 13 is arranged within each recess 7 between two adjacent posts 3. Each ferromagnetic intermediate member 13 is attached to the first lateral surface 4 and the second lateral surface 5 of two adjacent posts 3 by means of at least two permanent magnets 6. At least one first permanent magnet 6.1 is arranged between the first lateral surface 4 and a first surface 8 facing the first lateral surface 4 of the ferromagnetic intermediate member 13. At least a second permanent magnet 6.2 is arranged between the second lateral surface 5 and a second surface 9 facing the second lateral surface 5 of the ferromagnetic intermediate member 13. The ferromagnetic intermediate members 13 are shaped such as to have smaller dimensions than the recesses 7 at least in a plane perpendicular to the axis of rotation 11 of the rotor 2. Hence, a gap 12 is left open between an inner surface 15 of the ferromagnetic intermediate members 13 facing towards the axis or rotation 11 and the ferromagnetic base element 2.

Both permanent magnets 6.1, 6.2 are oriented such that the same magnetic pole is oriented towards the ferromagnetic intermediate member 13. As all permanent magnets 6 of the rotor 2 are all identically oriented, all ferromagnetic intermediate members 13 are magnetized such as to bear the same magnetic pole. Likewise, all posts 3 of the ferromagnetic base element 2 are magnetized to bear the magnetic pole which is opposite to the magnetic pole of the ferromagnetic intermediate members 13. The different magnetization of intermediate members 13 as well as posts 3 and ferromagnetic base element 2 is symbolized on FIG. 1 by the signs "+" and "−". It is understood that an inversion of the orientation of the permanent magnets 6 would likewise cause an inversion of the magnetic polarity of the ferromagnetic intermediate members 13 as well as the posts 3 and the ferromagnetic base element 2.

Figure 2:
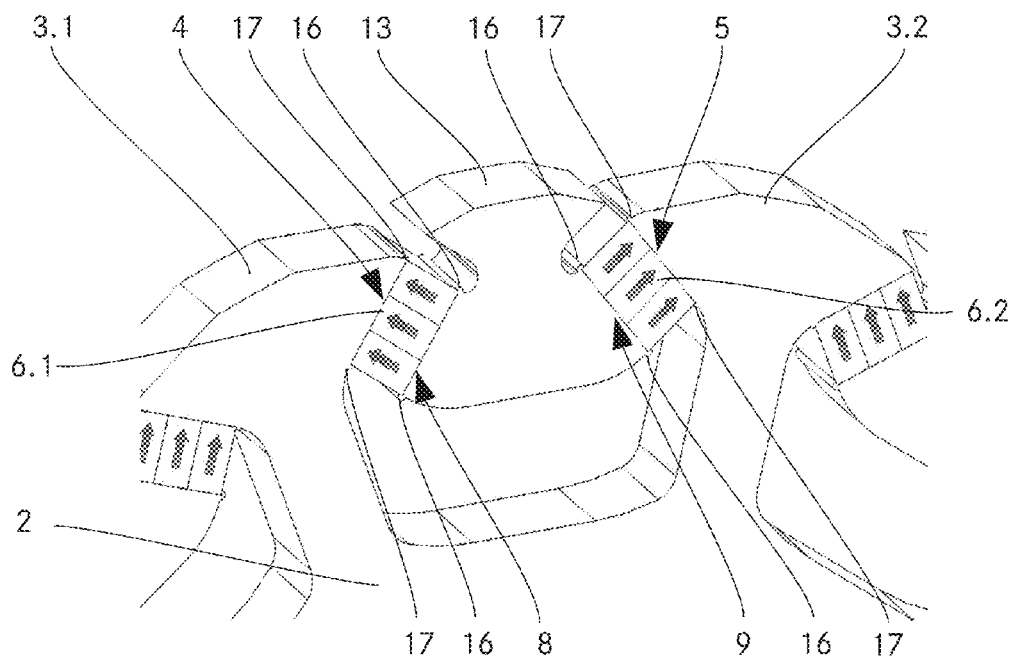
FIG. 2 a three-dimensional detail view of two adjacent posts.

In the embodiment shown on FIG. 2, both the first lateral surfaces 4 and the second lateral surfaces 5 are planar and arranged such that the distance between the first lateral surface 4 and the second lateral surface 5 of neighbouring posts 3 decreases with increasing distance from the axis of rotation 11 of the rotor 1. As is shown by dashed lines, an imaginary prolongation of the first lateral surface 4 and the second lateral surface 5 will intersect at an angle 14. In the embodiment shown the angle 14 is 70°. The provision of a diminishing distance between first lateral surfaces 4 and second lateral surfaces 5 will additionally lock the ferromagnetic intermediate members 13 as well as the permanent magnets 6 against the posts 3 by the centrifugal force when the rotor 2 is rotated about the axis 11.

Further, the ferromagnetic base element 2 comprises a central opening into which a transmission shaft 10 is secured to transmit torque from or to the rotor, depending on the kind of electrical machine the rotor 2 is used with.

FIG. 2 shows a three-dimensional detail view of two adjacent posts 3.1, 3.2 with a ferromagnetic intermediate member 13 arranged in between. The permanent magnets 6.1, 6.2 each comprise three separate magnet elements attached together. The arrows on the magnet elements schematically represent the orientation of the magnetic pole of each magnetic element. As may be seen, all magnetic elements are oriented such that the same pole faces the ferromagnetic intermediate member 13. As may further be seen on this figure, the first lateral surface 4 as well as the second lateral surface 5 are each bordered by a first form-fit connection element 17 which is provided in the form of a nose. Similarly, the first surface 8 and the second surface 9 of the ferromagnetic intermediate member 13 facing said first lateral surface 4 and said second lateral surface 5, respectively, are also each bordered by a second form-fit connection element 16 which is also provided in the form of a nose. The permanent magnets 6.1, 6.2 are arranged between said first form-fit connection elements 17 and said second form-fit connection elements 16. Additionally, the permanent magnets may further by attached to said posts 3 and said ferromagnetic intermediate member 13 by adhesive bonding.

Figure 3:
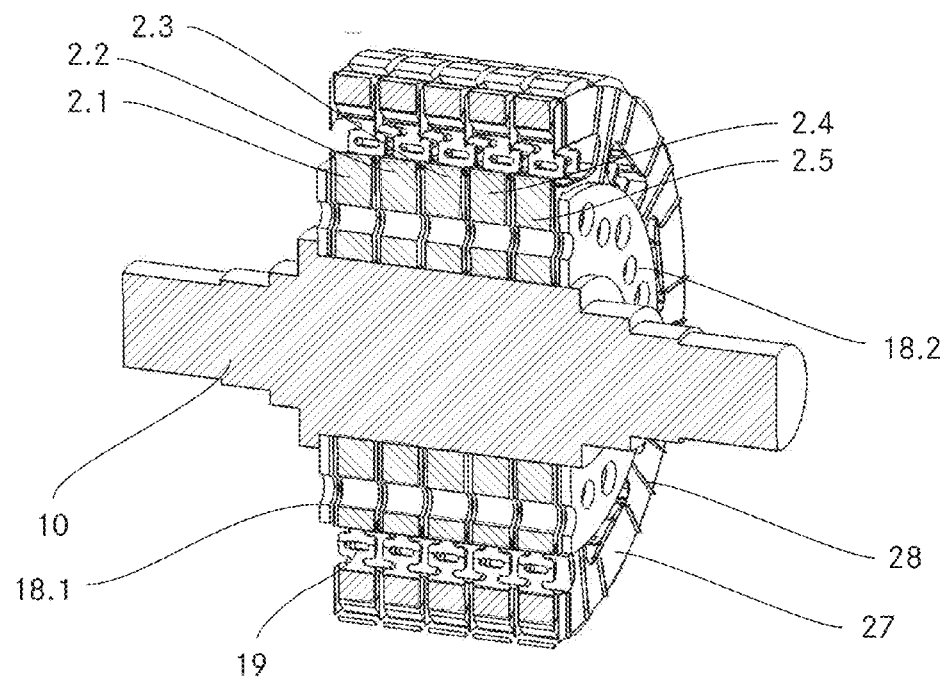
FIG. 3 a cut-view of an inventive rotor.

FIG. 3 shows a cut-view of an inventive rotor 1 comprising a plurality of ferromagnetic base elements 2.1, 2.2, 2.3, 2.4, 2.5 arranged on a common shaft 10. An intermediate spacer plate 27 is arranged between each two adjacent ferromagnetic base elements 2. However, such as not to make the illustration unclear, only one intermediate spacer plate 27 is marked on FIG. 3. Further, non-magnetic support members 19 arranged between each ferromagnetic intermediate member 13 and the respective base element 2.1, 2.2, 2.3, 2.4, 2.5 may be seen on this figure. The intermediate spacer plates 27 are stainless (none magnetic) steel sheets, each having radially oriented bars 28 upon which ferromagnetic base elements 2.1, 2.2, 2.3, 2.4, 2.5 may buttress onto, such as to allow a spacing between two neighbouring ferromagnetic base elements 2.1, 2.2, 2.3, 2.4, 2.5 in the axial direction. The radial bars 28 have a radial orientation to achieve a ventilation effect during the operation of the rotor 1. Further, the intermediate spacer plates 27 have openings arranged to be concentric with gaps 12 of the ferromagnetic base elements 2.1, 2.2, 2.3, 2.4, 2.5. These openings are necessary for axial flow of coolant air which is ventilated in the ducts formed between the radial bars 28 of the intermediate spacer plates 27.

The assembly of ferromagnetic base elements 2.1, 2.2, 2.3, 2.4, 2.5 and intermediate spacer plates 27 is sandwiched between a first pressure plate 18.1 and a second pressure plate 18.2 arranged on the central shaft 10. The diameter of the two magnetic pressure plates 18.1, 18.2 must be inside the radial bottom line of the gap 12, otherwise those pressure plates 18.1, 18.2 would cause leakage inductances between the opposite magnet poles of the ferromagnetic base element 2 and the ferromagnetic intermediate members 13. In the embodiment shown, two spacer plates 27 are arranged between each of the pressure plates 18.1, 18.2 and the adjacent ferromagnetic base element 2.1, 2.5, respectively, such as to provide some spacing between said pressure plates 18.1, 18.2 and said ferromagnetic base elements 2.1, 2.5.

Figure 4:
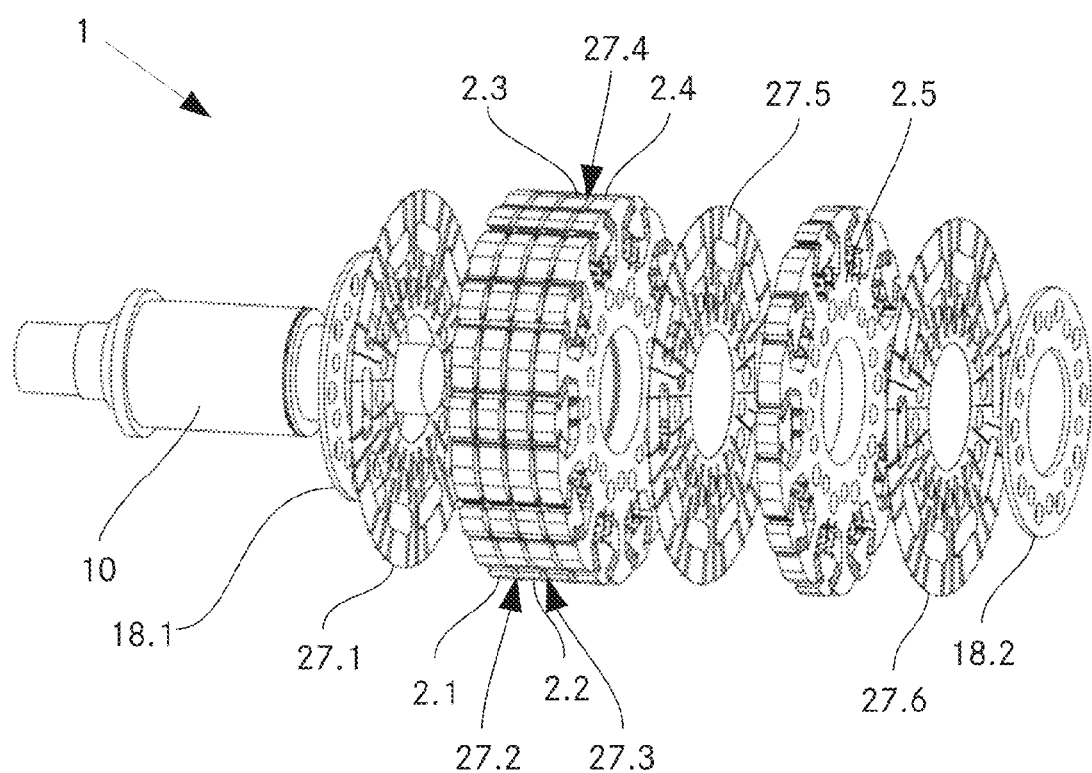
FIG. 4 a perspective representation of an exploded view of an inventive rotor.

FIG. 4 is a perspective representation of an exploded view of an inventive rotor 1 comprised of several ferromagnetic base elements 2.1, 2.2, 2.3, 2.4, 2.5. An intermediate spacer plate 27.2, 27.3, 27.4, 27.5 is arranged between each pair of neighbouring ferromagnetic base elements 2.1, 2.2, 2.3, 2.4, 2.5. Further, one intermediate spacer plate 27.1, 27.2 each is arranged between the first pressure plate 18.1 and its adjacent ferromagnetic base element 2.1 as well as between the second pressure plate 18.2 and its adjacent ferromagnetic base element 2.5. Both pressure plates 18.1, 18.2 fix the sandwich-like structure of ferromagnetic base elements 2.1, 2.2, 2.3, 2.4, 2.5 and intermediate spacer plates 27.1, 27.2, 27.3, 27.4, 27.5, 27.6 axially on the central shaft 10. To hold this assembly together, treaded bars (not shown) are passed through openings provided in said ferromagnetic base elements 2.1, 2.2, 2.3, 2.4, 2.5, said intermediate spacer plates 27.1, 27.2, 27.3, 27.4, 27.5, 27.6 and the two pressure plates 18.1, 18.2. The threaded bars are secured by ways of threaded nuts onto the two pressure plates 18.1, 18.2.

Figure 5:
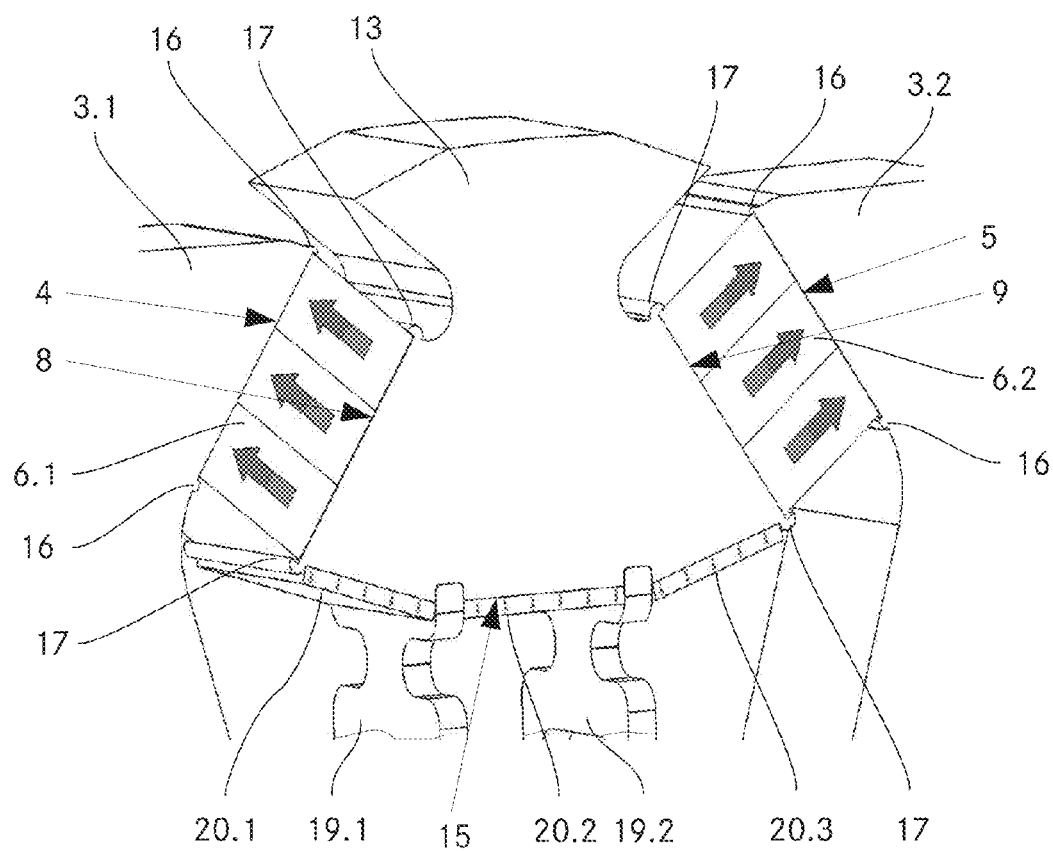
FIG. 5 a detail of another preferred embodiment of the inventive rotor.

FIG. 5 shows a detail of another preferred embodiment of the inventive rotor 1. In this embodiment, additional permanent magnets 20.1, 20.2, 20.3 are attached to the inner surface 15 of the ferromagnetic intermediate member 13 facing the ferromagnetic base element 2. The additional permanent magnets 20.1, 20.2, 20.3 are oriented such that the same magnetic pole of the additional permanent magnets 20.1, 20.2, 20.3 as the pole of the permanent magnets 6.1, 6.2 faces towards the ferromagnetic intermediate member 13. Further, two non-magnetic support members 19.1, 19.2 are arranged in the gap 17 between the inner surface 15 and the ferromagnetic base element 2. Otherwise, this embodiment also includes form-fit connection elements 16, 17 bordering the first lateral surface 4, the second lateral surface 5 as well as the first surface 8 and the second surface 9 of the ferromagnetic intermediate member 13.

Figure 6:
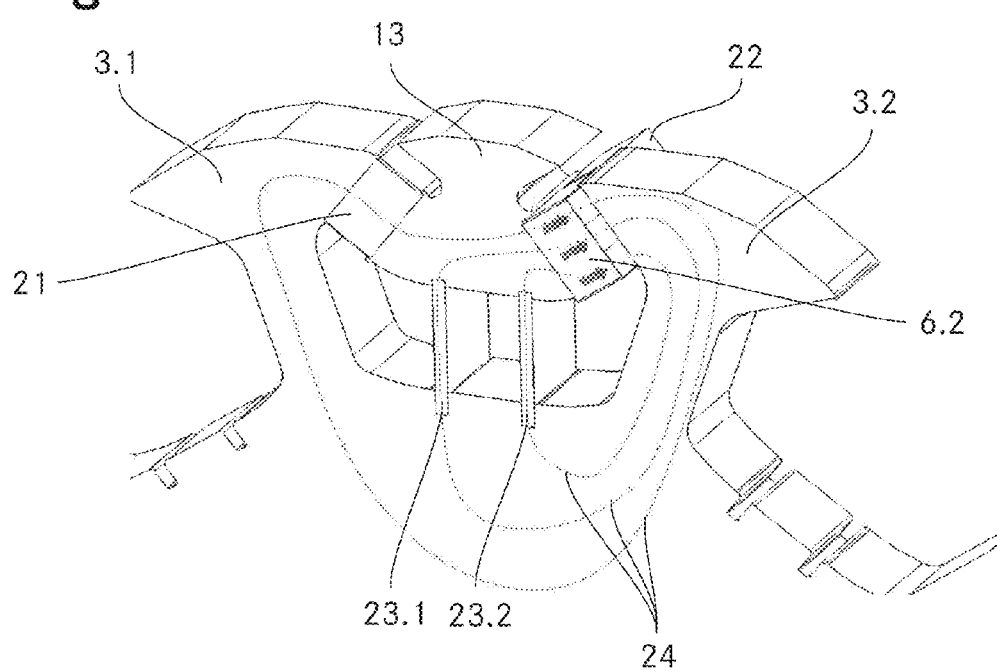
FIG. 6 the step of substituting a second non-magnetic auxiliary element with a permanent magnet.

FIG. 6 depicts the step of substituting a second non-magnetic auxiliary element 22 with a permanent magnet 6.2. The ferromagnetic intermediate member 13 is hold in place between the two adjacent posts 3.1, 3.2 by means of a first non-magnetic auxiliary element 21, the second non-magnetic auxiliary element 22 as well as two paramagnetic third auxiliary elements 23.1, 23.2. The lines 24 symbolize the magnetic flux induced by the introduction of the permanent magnet 6.2. This induced magnetic flux pulls the permanent magnet 6.2 into position, thus greatly facilitating the assembly of the rotor 1.

Figure 7:
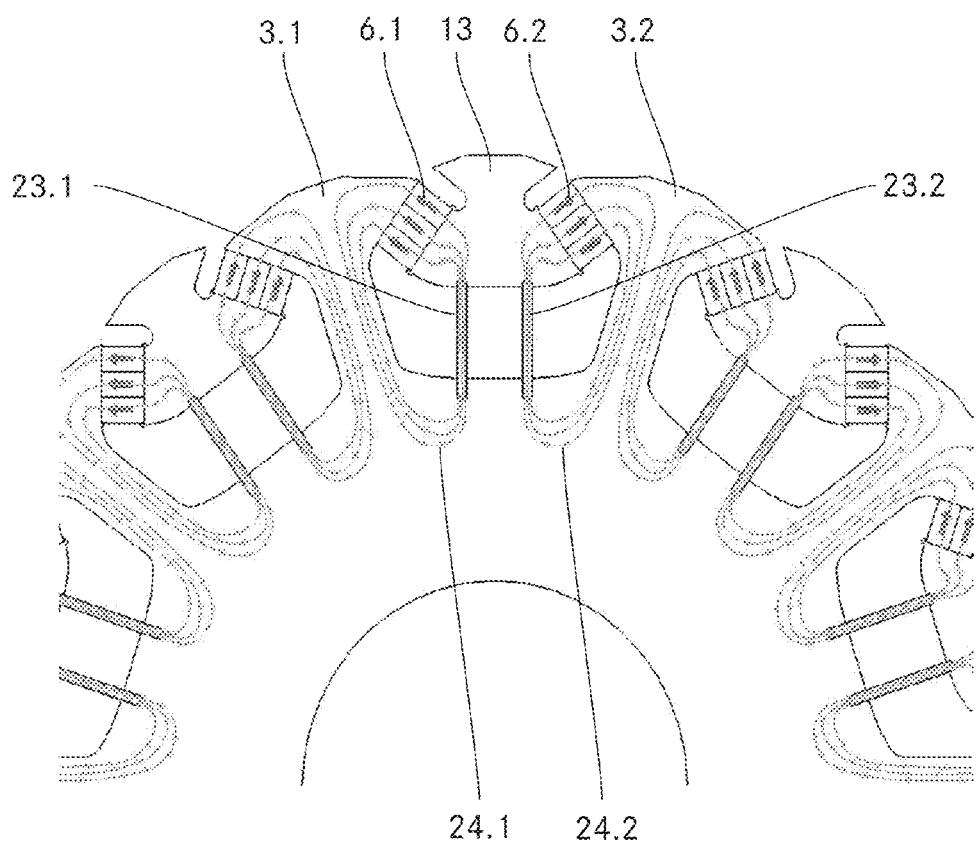
FIG. 7 a detail of the assembled rotor prior to the substitution of the third paramagnetic auxiliary elements.

FIG. 7 shows a detail of the assembled rotor 1 prior to the substitution of the third paramagnetic auxiliary elements 24.1, 24.2 with the non-magnetic support members 19.1, 19.2. When both the first auxiliary element 21 and the second auxiliary element 22 are substituted with permanent magnets 6.1, 6.2, two magnetic fluxes 24.1, 24.2 are induced. Each of these fluxes 24.1, 24.2 is emanating from a permanent magnet 6.1, 6.2 and passes through the adjoining post 3.1, 3.2 into the ferromagnetic base element 2. From there, the magnetic flux 24.1, 24.2 passes through one of the third paramagnetic auxiliary elements 23.1, 23.2 into the ferromagnetic intermediate member 13 and back into the respective permanent magnet 6.1, 6.2. Upon replacement of the third paramagnetic third auxiliary elements 23.1, 23.2 with non-magnetic support members 19.1, 19.2 the magnetic fluxes 24.1, 24.2 are interrupted. Preferably, the replacement of the third paramagnetic auxiliary elements 23.1, 23.2 is done after the adhesive between the permanent magnets 6.1, 6.2 and both lateral surfaces 5, 6 has cured.

Figure 8:
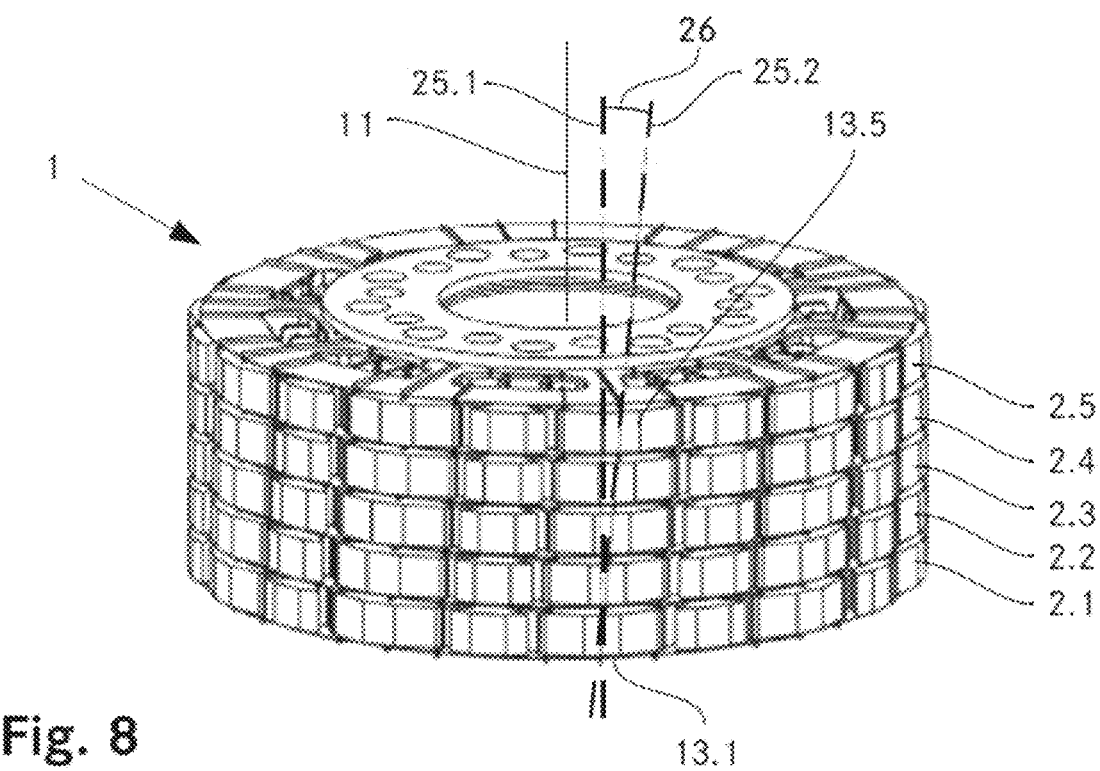
FIG. 8 a perspective representation of another embodiment of an inventive rotor.

FIG. 8 is a perspective representation of another embodiment of t rotor 1 according to the present invention. In this embodiment, the rotor 1 comprises five ferromagnetic base elements 2.1, 2.2, 2.3, 2.4, 2.5 stacked one upon the other in the axial direction of the rotor 1. Each ferromagnetic base element 2.1, 2.2, 2.3, 2.4, 2.5 in each pair of neighbouring ferromagnetic base elements 2.1, 2.2, 2.3, 2.4, 2.5 is angularly shifted to its neighbour by an angle, e.g. 0.75°. By this angular shift the posts and ferromagnetic intermediate members of each of the ferromagnetic base elements 2.1, 2.2, 2.3, 2.4, 2.5 are offset from the posts and ferromagnetic intermediate members of the neighbouring ferromagnetic base element 2.1, 2.2, 2.3, 2.4, 2.5 along the circumference of the rotor 1. This is exemplarily shown with the example of one ferromagnetic intermediate member 13.1 of a first ferromagnetic base element 2.1 and one ferromagnetic intermediate member 13.5 of a last ferromagnetic base element 2.5 along the axis 11 of the rotor 1.

Figure 9:
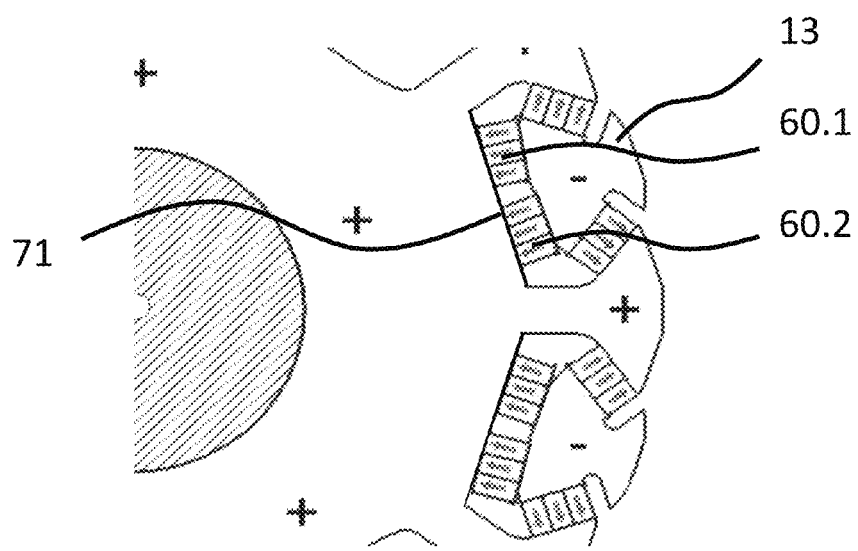
FIG. 9 a detail of another embodiment of an inventive rotor.

FIG. 9 is a detailed view of another embodiment according to the invention. During operation of the rotor the intermediate member of the rotor will experience a radial load due to the magnetic forces between stator and rotor. This radial load may cause the intermediate member 13 to rotate slightly within the recess 7 offsetting the intermediate from an optimal position in terms of achieving the highest possible magnetic field strength exiting the intermediate member 13. By placement of one or more rotation locking permanent magnets between the intermediate member 13 and a bottom surface 71 of the recess 7, the intermediate member 13 may be locked in an optimal position. A further advantage to this embodiment is the strengthening of the magnetic field rather than potential "short circuiting" In e of the magnetic field lines either through air in the recess 7 or through neighbouring ferromagnetic material in the ferromagnetic base element. To ensure that the magnetic field is strengthened the magnetic pole of the rotation locking permanent magnet must be oriented so that the same magnetic poles are facing the intermediate member 13 from both permanent magnets 6.1, 6.2 and rotation locking permanent magnets 60.1, 60.2.

The helix angle 26 between an intermediate member on a first ferromagnetic base element 2.1 and a last ferromagnetic base element 2.5 along the length of the rotor 1 is dependent on the total angular shift $\Delta\alpha_{total}$ between the ferromagnetic base elements 2.1, 2.2, 2.3, 2.4, 2.5, the diameter of the rotor as well as the total length of a "package" comprising the ferromagnetic base elements 2.1, 2.2, 2.3, 2.4, 2.5 and any intermediate spacer plates arranged therebetween. This helix angle 26 may be calculated as follows:

$$\text{helix angle} = \arctan\left(\frac{\frac{D * \pi * \Delta\alpha_{total}}{360°}}{L}\right)$$

where D is the diameter of the rotor 1 (which equals the diameter of a ferromagnetic base element 2.1, 2.2, 2.3, 2.4, 2.5), $\Delta\alpha_{total}$ is the total angular shift between the first ferromagnetic base element 2.1 and the last of ferromagnetic base element 2.5 and L is the total length of the ferromagnetic base elements 2.1, 2.2, 2.3, 2.4, 2.5 and any intermediate spacer plates arranged therebetween.

The invention claimed is:

1. Rotor for an electrical machine comprising at least one substantially cylindrically shaped ferromagnetic base element (2), said ferromagnetic base element (2) including a multitude of posts (3, 3.1, 3.2) radially extending therefrom, each of said posts (3, 3.1, 3.2) being bordered by at least a first lateral surface (4) and a second lateral surface (5), wherein recesses (7) are defined between each pair of neighbouring posts (3, 3.1, 3.2), one ferromagnetic intermediate member (13) is arranged in each recess (7) between each pair of posts (3, 3.1, 3.2), characterized in that each ferromagnetic intermediate member (13) is affixed to the first lateral surface (4) of a first post (3.1) and to the second lateral surface (5) of a second post (3.2) of each pair of posts (3, 3.1, 3.2) by means of at least one permanent magnet (6, 6.1, 6.2), respectively, said permanent magnets (6, 6.1, 6.2) being each oriented such that the same pole faces said ferromagnetic intermediate members (13) wherein said first lateral surface (4) and said second lateral surface (5) are shaped such that the distance between the first lateral surface (4) and the second lateral surface (5) decreases with increasing distance from the rotation axis (11) of the rotor (1) in a radial direction and in that an inner surface (15) of each ferromagnetic intermediate member (13) facing towards the rotor axis (11) is covered with at least one additional permanent magnet (20.1, 20.2, 20.3), said at least one additional permanent magnet (20.1, 20.2, 20.3) being arranged such that the pole oriented towards the ferromagnetic intermediate members (13) is the same pole as the pole of the permanent magnets (6, 6.1, 6.2) oriented towards said ferromagnetic intermediate members (13).

2. Rotor according to claim 1, wherein said permanent magnets (6, 6.1, 6.2) have opposing north and south magnetic poles and said permanent magnets being each oriented such that the magnetic poles facing one of said ferromagnetic intermediate members (13) are the same.

3. Rotor according to claim 1, wherein each ferromagnetic intermediate member (13) is affixed to a bottom surface (71) of the recess (7) by means of at least one rotation locking permanent magnet (60.1, 60.2), said at least one rotation locking permanent magnets (60.1, 60.2) being each oriented such that the same pole faces said ferromagnetic intermediate members (13).

4. Rotor according to claim 3, wherein the at least one rotation locking permanent magnet (60.1, 60.2) has a distal surface abutting the intermediate member (13) and a proximal surface abutting the bottom surface (71) of the recess (7).

5. Rotor according to claim 3, wherein the at least one rotation locking permanent magnet (60.1, 60.2) having the distal surface abutting the intermediate member (13) and the proximal surface abutting the bottom surface (71) of the recess (7) has dimensions sufficiently large to lock the rotation of the intermediate member (13).

6. Rotor according to claim 3, wherein the rotor comprises at least two rotation locking permanent magnets (60.1, 60.2) having distal surfaces abutting the intermediate member (13) and proximal surfaces abutting the bottom surface (71) of the recess (7) and that the ferromagnetic intermediate member (13) is affixed to the first lateral surface (4) of a first post (3.1) and to the second lateral surface (5) of a second post (3.2) of each pair of posts (3, 3.1, 3.2) by means of at least one permanent magnet (6, 6.1, 6.2), respectively, said permanent magnets (6, 6.1, 6.2) being each oriented such that the same pole faces said ferromagnetic intermediate members (13) and is further affixed to said bottom surface (71) of said recess by said at least two additional permanent magnets, said intermediate member (13) thereby being affixed to said ferromagnetic base element (2) in at least for different fixing points, said fixing point being defined by a permanent magnet fixed between said ferromagnetic base member (2) and said ferromagnetic intermediate member (13).

7. Rotor according to claim 1, wherein said first and second lateral surface permanent magnets (6, 6.1, 6.2) have opposing north and south magnetic poles and said permanent magnets being each oriented such that the magnetic poles facing one of said ferromagnetic intermediate members (13) are the same.

8. Rotor according to claim 1, wherein said first lateral surface (4) and said second lateral surface (5) of said posts (3, 3.1, 3.2) and/or a first surface (8) and a second surface (9) of the ferromagnetic intermediate members (13) facing said first lateral surface (4) and said second lateral surface (5) comprise at least one form-fit connection element (16, 17) allowing a form-fit connection with said at least one permanent magnet (6, 6.1, 6.2), said form-fit connection element (6, 7).

9. Rotor according to claim 8, wherein said at least one permanent magnet (6, 6.1, 6.2) is fastened to said first lateral surface (4) and said second lateral surface (5) and/or to said first surface (8) or said second surface (9) of the ferromagnetic intermediate member (13) facing said first lateral surface (4) and said second lateral surface (5) by means of an adhesive.

10. Rotor according to claim 1, wherein said rotor (1) comprises a multitude of ferromagnetic base elements (2) stacked one upon the other in the axial direction of the rotor (1).

11. Rotor according to claim 10, wherein an intermediate spacer plate (18) is arranged between each of two neighbouring ferromagnetic base elements (2), said intermediate spacer plate (18) comprising radial air ducts.

12. Rotor according to any of claim 10, wherein neighbouring ferromagnetic base elements (2) are shifted angularly to each other in the axial direction.

13. Rotor according to claim 1, wherein at least one non-magnetic support member (19, 19.1, 19.2) is arranged in each gap (12) formed between the inner surface (15) of each ferromagnetic intermediate member (13) facing towards the rotor axis (11) and the ferromagnetic base element (2).

14. Rotor according to claim 1, wherein said ferromagnetic intermediate members (13) are made of a plurality of stacked sheets of magnetic steel.

15. Rotor according to claim 1, wherein said at least one ferromagnetic base element (2) is arranged on a shaft (10) and attached thereto by an adhesive shrink-fit connection.

* * * * *